US012335152B2

(12) United States Patent
Qureshi

(10) Patent No.: US 12,335,152 B2
(45) Date of Patent: Jun. 17, 2025

(54) MODIFYING NETWORK ROUTING AND BANDWIDTH BALANCING FOR LOWER LATENCY AND HIGH QUALITY FAIR TRAFFIC

(71) Applicant: Hourglass Software LLC, Dover, DE (US)

(72) Inventor: Faisal A. Qureshi, Kirkland, WA (US)

(73) Assignee: HOURGLASS SOFTWARE LLC, Dover, DE (US)

( * ) Notice: Subject to any disclaimer, the term of this patent is extended or adjusted under 35 U.S.C. 154(b) by 102 days.

(21) Appl. No.: 18/464,359

(22) Filed: Sep. 11, 2023

(65) Prior Publication Data
US 2024/0275726 A1 Aug. 15, 2024

Related U.S. Application Data

(60) Provisional application No. 63/484,691, filed on Feb. 13, 2023.

(51) Int. Cl.
H04L 47/125 (2022.01)
H04L 45/02 (2022.01)
H04L 45/125 (2022.01)
H04L 47/127 (2022.01)

(52) U.S. Cl.
CPC ............ H04L 47/125 (2013.01); H04L 45/08 (2013.01); H04L 45/125 (2013.01); H04L 47/127 (2013.01)

(58) Field of Classification Search
None
See application file for complete search history.

(56) References Cited

U.S. PATENT DOCUMENTS

| 11,223,538 | B1 | 1/2022 | Arumugam et al. |
| 2006/0072543 | A1 | 4/2006 | Lloyd et al. |
| 2013/0322255 | A1 | 12/2013 | Dillon |
| 2018/0359172 | A1* | 12/2018 | Yadav .................... H04L 45/70 |
| 2019/0097912 | A1 | 3/2019 | Salam |
| 2020/0153701 | A1 | 5/2020 | Mohan et al. |

(Continued)

OTHER PUBLICATIONS

International Search Report and Written Opinion received for PCT Application Serial No. PCT/US23/79551 dated Mar. 1, 2024, 22 pages.

Primary Examiner — Fadi Haj Said
(74) Attorney, Agent, or Firm — Amin, Turocy & Watson, LLP

(57) ABSTRACT

The described technology generally relates to modifying network routing and bandwidth balancing for lower latency and high quality fair traffic. For instance, based on network routing data comprising network quality data representative of a network quality applicable to a wide area network and using machine learning applied to historical network routing data, other than the network routing data, available routes are classified, the available routes being between a source node on the wide area network and a destination node on the wide area network. Further, based on the network routing data and using a result of the machine learning applied to the historical network routing data, bandwidth allocations applicable to the classified available routes can be determined. Then, based on the classified available routes and the predicted bandwidth allocations, a route is set for data transmitted from the source node to the destination node.

20 Claims, 10 Drawing Sheets

(56) References Cited

U.S. PATENT DOCUMENTS

2020/0252324 A1  8/2020  Charles et al.
2023/0145097 A1* 5/2023  Kiran .................. H04L 47/2483
                                                         370/235

* cited by examiner

702 — BASED ON NETWORK ROUTING DATA COMPRISING NETWORK QUALITY DATA REPRESENTATIVE OF A NETWORK QUALITY APPLICABLE TO A WIDE AREA NETWORK AND USING MACHINE LEARNING APPLIED TO HISTORICAL NETWORK ROUTING DATA, GENERATED FROM A TIME PREVIOUS TO THE NETWORK ROUTING DATA BEING GENERATED, CLASSIFYING AVAILABLE ROUTES BETWEEN A SOURCE NODE ON THE WIDE AREA NETWORK AND A DESTINATION NODE THAT ARE PART OF THE WIDE AREA NETWORK, RESULTING IN CLASSIFIED AVAILABLE ROUTES

704 — BASED ON THE NETWORK ROUTING DATA AND USING THE MACHINE LEARNING APPLIED TO THE HISTORICAL NETWORK ROUTING DATA, DETERMINING BANDWIDTH ALLOCATIONS APPLICABLE TO THE CLASSIFIED AVAILABLE ROUTES, RESULTING IN PREDICTED BANDWIDTH ALLOCATIONS

706 — BASED ON THE CLASSIFIED AVAILABLE ROUTES AND THE PREDICTED BANDWIDTH ALLOCATIONS, SETTING A ROUTE FOR DATA TRANSMITTED FROM THE SOURCE NODE TO THE DESTINATION NODE

FIG. 7

MODIFYING NETWORK ROUTING AND BANDWIDTH BALANCING FOR LOWER LATENCY AND HIGH QUALITY FAIR TRAFFIC

CROSS REFERENCE TO RELATED APPLICATION

The subject patent application claims priority to U.S. Provisional Patent Appln. No. 63/484,691, filed Feb. 13, 2023, entitled "Optimized Network Routing and Bandwidth Balancing for lower latency and high quality "fair" traffic using Machine Learning". The entirety of the aforementioned application is hereby incorporated by reference herein.

TECHNICAL FIELD

The disclosed subject matter relates to network routing and, more particularly, to modifying, e.g., optimizing using machine learning, network routing and bandwidth balancing for lower latency and high quality fair traffic.

BACKGROUND

For wide area networks, the shortest path can be calculated between nodes based on certain weights for the path from node to node. Each packet sent and received has its own latency and quality for the data transmission. Part of this is based on how much bandwidth is being allocated for that network communication, and the latency also depends on the route that the data takes. Acknowledgements or error correction can be utilized to ensure data transmission quality. Throughput of the data also depends on bandwidth, which determines how much data can be sent or received between nodes within a period of time. Furthermore, wide area networks also apply bandwidth balancing mechanisms due to limited capacity.

The above-described background relating to network routing is merely intended to provide a contextual overview of some current issues and is not intended to be exhaustive. Other contextual information may become further apparent upon review of the following detailed description.

BRIEF DESCRIPTION OF DRAWINGS

FIG. 7 is a block flow diagram for a process associated with optimized network routing and bandwidth balancing in accordance with one or more embodiments described herein.

DETAILED DESCRIPTION

Figure 1:
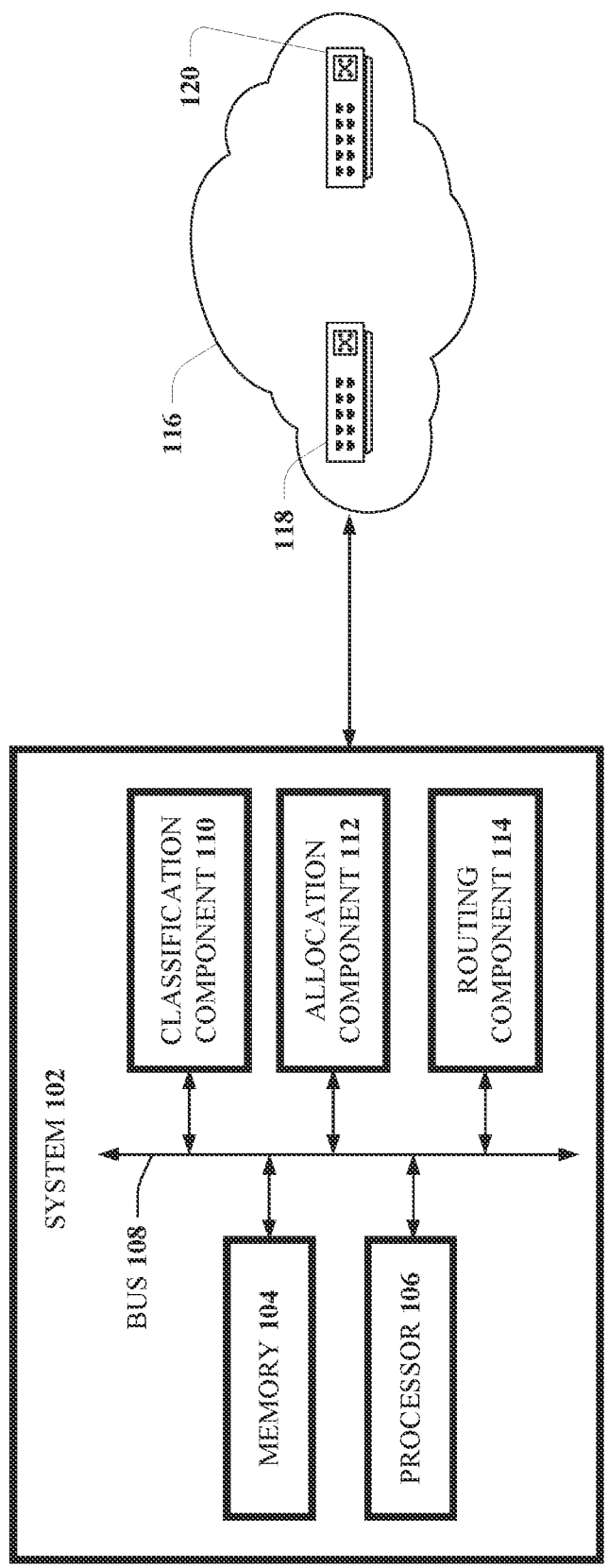
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, network routing and bandwidth balancing can be improved in various ways, and various embodiments are described herein to this end and/or other ends.

According to an embodiment, a system can comprise a processor, and a memory that stores executable instructions that, when executed by the processor, facilitate performance of operations, comprising, based on network routing data comprising network quality data representative of a network quality applicable to a wide area network and using machine learning applied to historical network routing data, other than the network routing data, classifying available routes between a source node on the wide area network and a destination node on the wide area network, resulting in classified available routes, based on the network routing data and using a result of the machine learning applied to the historical network routing data, determining bandwidth allocations applicable to the classified available routes, resulting in predicted bandwidth allocations, and based on the classified available routes and the predicted bandwidth allocations, setting a route for data transmitted from the source node to the destination node.

In various embodiments, the route can be determined to satisfy a defined wide area network latency criterion applicable to the wide area network, a defined wide area network quality of service criterion applicable to the wide area network, a defined local area network latency criterion applicable to the source node or the destination node, or a defined local area network quality of service criterion applicable to the source node or the destination node.

In various embodiments, the network routing data can further comprise region data, and the region data can comprise one or more regional metrics applicable to at least one of the source node or the destination node. In this regard, the one or more regional metrics can comprise at least one of a region identifier, a first quantity of active node pairs in a region comprising the source node or the destination node, a second quantity of node pair routes in the region, an average packet latency applicable to the region, an average network throughput applicable to the region, a quality according to a defined quality metric applicable to the region, or a total bandwidth applicable to the region.

In various embodiments, at least one of the source node or the destination node can comprise a network router or a network switch.

In various embodiments, the network routing data can further comprise node pair data representative of one or more metrics applicable to a node pair comprising a pair of nodes that are part of the wide area network. In this regard, the node pair data can comprise a route identifier applicable to the node pair, a latency applicable to the node pair, a throughput applicable to the node pair, or a quality according to a defined quality metric applicable to the node pair.

In various embodiments, the above operations further comprise, based on the route and using machine learning applied to past routes, other than the route, setting a bandwidth for the route that has been determined to satisfy a defined wide area network quality criterion. In this regard, the defined wide area network quality criterion can be satisfied as a function of a threshold wide area network quality metric. Further, the threshold wide area network quality metric can comprise a latency metric or a quality of service metric associated with other routes, other than the route.

In various embodiments, the above operations further comprise determining the network routing data.

In another embodiment, a non-transitory machine-readable medium can comprise executable instructions that, when executed by a processor, facilitate performance of operations, comprising, based on network routing data comprising network quality data representative of a network quality applicable to a wide area network and using machine learning applied to historical network routing data, generated from a time previous to the network routing data being generated, classifying available routes between a source node on the wide area network and a destination node that are part of the wide area network, resulting in classified available routes, based on the network routing data and using the machine learning applied to the historical network routing data, determining bandwidth allocations applicable to the classified available routes, resulting in predicted bandwidth allocations, and based on the classified available routes and the predicted bandwidth allocations, setting a route for data transmitted from the source node to the destination node.

In various embodiments, the historical network routing data can comprise one or more metrics, which can comprise historical region data comprising one or more historical regional metrics applicable to the wide area network, or historical node pair data representative of one or more historical metrics applicable to a node pair comprising a pair of nodes that are part of the wide area network, or historical network quality data representative of historical network quality applicable to the wide area network.

In various embodiments, the route can be determined to satisfy a defined wide area network latency criterion applicable to the wide area network, a defined wide area network quality of service criterion applicable to the wide area network, a defined local area network latency criterion applicable to at least one of the source node or the destination node, or a defined local area network quality of service criterion applicable to at least one of the source node or the destination node.

According to yet another embodiment, a method can comprise, based on network routing data representative of a network quality applicable to a wide area network and using machine learning applied to historical network routing data, other than the network routing data, classifying, by network equipment comprising a processor, available routes between a source node on the wide area network and a destination node on the wide area network, resulting in classified available routes, based on the network routing data and using the machine learning applied to the historical network routing data, determining, by the network equipment, bandwidth allocations applicable to the classified available routes, resulting in predicted bandwidth allocations, and based on the classified available routes and the predicted bandwidth allocations, setting, by the network equipment, a route for data transmitted from the source node to the destination node.

In various embodiments, the network routing data can comprise region data, and wherein the region data comprises one or more regional metrics applicable to the source node or the destination node.

In various embodiments, the network routing data can comprise node pair data representative of one or more metrics applicable to a pair of nodes on the wide area network.

It should be appreciated that additional manifestations, configurations, implementations, protocols, etc. can be utilized in connection with the following components described herein or different/additional components as would be appreciated by one skilled in the art.

Optimized network routing and bandwidth balancing for lower latency and high quality fair traffic (e.g., using a computerized tool) is enabled herein. Various embodiments herein can utilize network big data and machine learning. The machine learning herein can utilize, for instance, multi-classification processes on the network data to determine which available route the data should take, and how much bandwidth should be allocated for node to node data transmission, in order to improve latency and quality (e.g., for a larger region as well as node to node pairs).

In various embodiments herein, bandwidth and/or memory cache can be reserved (e.g., by a system herein) for data reporting herein. Metric data herein can, for instance, be utilized to train and predict routing and bandwidth calculations herein (e.g., using machine learning). In various embodiments, this metric data can be continuously processed. The machine learning herein can be continuously trained with historical data, within a data preservation lifetime (e.g., older data gets purged), and also with current statistics. This trained data can then be utilized by a system herein to classify available routes between node A (e.g., a source node) and node B (e.g., a destination node), which make up a node-pair (e.g., source and destination) into a category (e.g., one of sixteen nonlimiting exemplary categories described herein, though such categories are exemplary and other suitable quantities or combinations of categories are envisaged) and to perform an additional prediction regarding how much bandwidth to allocate for the node-pair in order for the larger view first, to have low latency and high quality traffic overall, and then to the node-pairs secondarily. The prediction can occur on each possible route (e.g., via a plurality of nodes) that the data can take where they are assigned a route ID. The bandwidth to set (e.g., by a system herein) for allocation can depend on bandwidth predictions and/or route predictions herein. In various embodiments, the wider scope of networking (e.g., wide area network) can take precedence over the more local scope (e.g., local area network).

Nonlimiting exemplary classifications each route can possess can comprise:
 1. Class A: Wide Low Latency, Wide High Quality, Local Low Latency, Local High Quality
 2. Class B: Wide Low Latency, Wide High Quality, Local Low Latency, Local Low Quality
 3. Class C: Wide Low Latency, Wide High Quality, Local High Latency, Local High Quality
 4. Class D: Wide Low Latency, Wide High Quality, Local High Latency, Local Low Quality 5. Class E: Wide Low Latency, Wide Low Quality, Local Low Latency, Local High Quality
6. Class F: Wide Low Latency, Wide Low Quality, Local Low Latency, Local Low Quality
7. Class G: Wide Low Latency, Wide Low Quality, Local High Latency, Local High Quality
8. Class H: Wide Low Latency, Wide Low Quality, Local High Latency, Local Low Quality
9. Class A: Wide High Latency, Wide High Quality, Local Low Latency, Local High Quality
10. Class B: Wide High Latency, Wide High Quality, Local Low Latency, Local Low Quality
11. Class C: Wide High Latency, Wide High Quality, Local High Latency, Local High Quality
12. Class D: Wide High Latency, Wide High Quality, Local High Latency, Local Low Quality
13. Class A: Wide High Latency, Wide Low Quality, Local Low Latency, Local High Quality
14. Class B: Wide High Latency, Wide Low Quality, Local Low Latency, Local Low Quality
15. Class C: Wide High Latency, Wide Low Quality, Local High Latency, Local High Quality
16. Class D: Wide High Latency, Wide Low Quality, Local High Latency, Local Low Quality Once the classification is made (e.g., via a system herein) for each possible route for the node-pair for the traffic, another potential prediction can be made (e.g., via a system herein) for each route regarding the corresponding bandwidth allocation. Once the route and bandwidth allocations are determined, the route to take and the bandwidth to allocate can be set (e.g., via a system herein) for that network traffic. A goal can be to determine values that achieve Wide Low Latency and Wide High Quality first. This, with the bandwidth amount to allocate, can optimize the wide area networks, and thus makes the communication more efficient on a macro scale.

The data sent from each node to a system herein can make up the machine learning feature vector, which can be used to train machine learning model(s) herein, and to make the predictions. Such data can comprise metric(s) employable to determine the classes and bandwidth to set for node-pairs. In various embodiments, data for the feature vector can be as follows (e.g., each region is made is spatial as neighboring nodes for data transmission where the distances for data to travel in accounted to account for latency by propagation delays):

| [REGION DATA] |
| --- |
| 1. Region ID |
| 2. Number of active node-pairs |
| 3. Number of node-pair routes |
| 4. Average packet latency |
| 5. Average network throughput |
| 6. 50th percentile mark of quality value |
| 7. Total amount of bandwidth |

In various embodiments, average packet latency (e.g., 4 in the above list), is not a raw value, but rather a classification based on the value. In various embodiments, the classes can be based on a range of latency results. For example, class A can comprise 0 to 50 ms, 50-100 ms, 100-200 ms, or another suitable latency, which can be customized and/or modified. In various embodiments, mark of quality value (e.g., 6 in the above list) can be utilized for class determination based on quality values for items, such as number of packets corruption, number of packets lost, etc., and can be calculated to be low quality, medium quality, and/or high quality. It is noted that such calculations can be customized or modified to achieve optimal results.

| [NODE-PAIR DATA] (for all REGIONS) |
| --- |
| 1. Node-pair id |
| 2. Number of valid routes from source to destination |
| 3. Amount of bandwidth allocated (adjustable for secondary prediction) |
| [ROUTE DATA] (for each route for each NODE-PAIRs) |
| 1. Route ID |
| 2. Latency |
| 3. Throughput |
| 4. Quality |
| [TARGET] (for each route) |
| • Class (e.g., as discussed above) |
| • the class can be computed with a formula by the data received for latency and quality and set using supervised learning for each route. |

It is noted that the same latency and quality classes can be used as in REGION data and/or for the route itself.

The foregoing can make up the feature vector, which can be utilized for machine learning training herein. The training can utilize supervised learning in which, based on the values, the multi-class classification described above can be made for each region, each node-pair, and/or each route using real-time traffic data and can comprise data associations herein. The foregoing can be determined, for instance, by calculating the statistics to output the class. Once each route has a classification, and a system herein can determine which subset of routes can be assigned for the node-pair traffic, as the prediction iterates through all possible routes which are known and can be used as an input for the prediction. The prediction feature vector can also utilize the current statistics of the current state network traffic. Depending on the final resulting class, in which the first goal is the allow regional optimization, and then local, the specific route is set for network traffic and the amount of bandwidth to allocate for that is set. If the result does not yield a class that achieves a defined criterion, then the amount of bandwidth to allocate can be adjusted (e.g., by a system herein) as a variable input for the routes. If the result is satisfactory (e.g., according to a defined criterion) at that bandwidth setting, then both the route to take and corresponding the amount of bandwidth can be set for each node-pair. In this regard, predictions can be made for each route, and if not optimal (e.g., according to a defined criterion), a system herein can perform the predictions again using different potential values for the amount of bandwidth to allocate.

The foregoing can ensure that network configurations herein are optimal and efficient. In various embodiments, a configuration herein can be executed by an Internet Service Provider (e.g., ISP) or another suitable network governing entity. The foregoing also ensures quality of service, in which the micro and macro scale networks latencies and quality are optimal while enabling fair usage of the available network resources and traffic patterns.

Turning now to FIG. 1, there is illustrated an example, non-limiting system 102 in accordance with one or more embodiments herein. System 102 can comprise a computerized tool, which can be configured to perform various operations relating to optimized network routing and bandwidth balancing. The system 102 can comprise one or more of a variety of components, such as memory 104, processor 106, bus 108, classification component 110, allocation component 112, and/or routing component 114. In various embodiments, the system 102 can be communicatively coupled to, or can further comprise, wide area network (WAN) 116, node 118 (e.g., a source node), and/or node 120 (e.g., a destination node). In various embodiments, one or more of the memory 104, processor 106, bus 108, classification component 110, allocation component 112, routing component 114, WAN 116, node 118, and/or node 120 can be communicatively or operably coupled (e.g., over a bus or wireless network) to one another to perform one or more functions of the system 102.

According to an embodiment, the classification component 110 can, based on network routing data comprising network quality data representative of a network quality applicable to a wide area network (e.g., WAN 116) and using machine learning applied to historical network routing data, other than the network routing data, classify available routes between a source node (e.g., node 118) on the wide area network (e.g., WAN 116) and a destination node (e.g., node 120) on the wide area network (e.g., WAN 116), resulting in classified available routes. Such available routes can comprise hops between nodes of the WAN 116 between the node 118 and the node 120 (see, e.g., FIG. 4). In various embodiments, network quality data herein can be based on one or more of a variety of network quality metrics such as bandwidth, bitrate, latency, packet loss, errors, throughput, transmission delay, availability, jitter, and/or another suitable quality of service metric. Such classified routes can comprise one or more of the nonlimiting exemplary classifications previously discussed. In various embodiments, the network routing data can further comprise region data. In this regard, the region data can comprise one or more regional metrics applicable to at least one of the source node (e.g., node 118) or the destination node (e.g., node 120). In various embodiments, the one or more regional metrics comprise at least one of a region identifier, a first quantity of active node pairs in a region comprising the source node (e.g., node 118) or the destination node (e.g., node 120), a second quantity of node pair routes in the region, an average packet latency applicable to the region, an average network throughput applicable to the region, a quality according to a defined quality metric applicable to the region, or a total bandwidth applicable to the region. In various embodiments, a region can correspond to a local area network (LAN) applicable to a node herein or another suitable defined region associated with a node herein. In various embodiments, the network routing data can further comprise node pair data representative of one or more metrics applicable to a node pair comprising a pair of nodes that are part of the WAN 116. In this regard, the node pair data can comprise a route identifier applicable to the node pair, a latency applicable to the node pair, a throughput applicable to the node pair, and/or a quality according to a defined quality metric applicable to the node pair. In various embodiments, the source node and/or the destination node comprises a network router or a network switch, or another suitable node such as a computer, modem, hub, bridge, server, mobile device, etc.

According to an embodiment, the allocation component 112 can, based on the network routing data and using a result of the machine learning applied to the historical network routing data, determine bandwidth allocations applicable to the classified available routes, resulting in predicted bandwidth allocations. Such bandwidth allocation predictions can comprise bandwidth predictions to optimize overall network quality herein (e.g., promoting low latency and high overall network quality first for the WAN 116 and also for LANs corresponding to the node 118, node 120, and/or other nodes on the WAN 116). In various embodiments, the historical network routing data can comprise one or more metrics. Such metrics can comprise historical region data comprising one or more historical regional metrics applicable to the wide area network, or historical node pair data representative of one or more historical metrics applicable to a node pair comprising a pair of nodes that are part of the wide area network, or historical network quality data representative of historical network quality applicable to the wide area network, or other suitable historical metrics.

According to an embodiment, the routing component 114 can, based on the classified available routes and the predicted bandwidth allocations, set a route for data transmitted from the source node (e.g., node 118) to the destination node (e.g., node 120). In various embodiments, the route can be determined to satisfy a defined wide area network latency criterion applicable to the wide area network, a defined wide area network quality of service criterion applicable to the wide area network, a defined local area network latency criterion applicable to the source node or the destination node, and/or a defined local area network quality of service criterion applicable to the source node or the destination node. In various embodiments, the set route can comprise an overall optimal WAN 116 latency, WAN 116 quality, LAN latency, and/or LAN quality according to a defined latency and/or quality optimization process. In this regard, in various embodiments, the wider scope of networking (e.g., wide area network) can take precedence over the more local scope (e.g., local area network). A goal can be to determine values that achieve wide low latency and wide high quality first. This, with the bandwidth amount to allocate, can optimize the wide area networks, and thus makes the communication more efficient on a macro scale.

Figure 2:
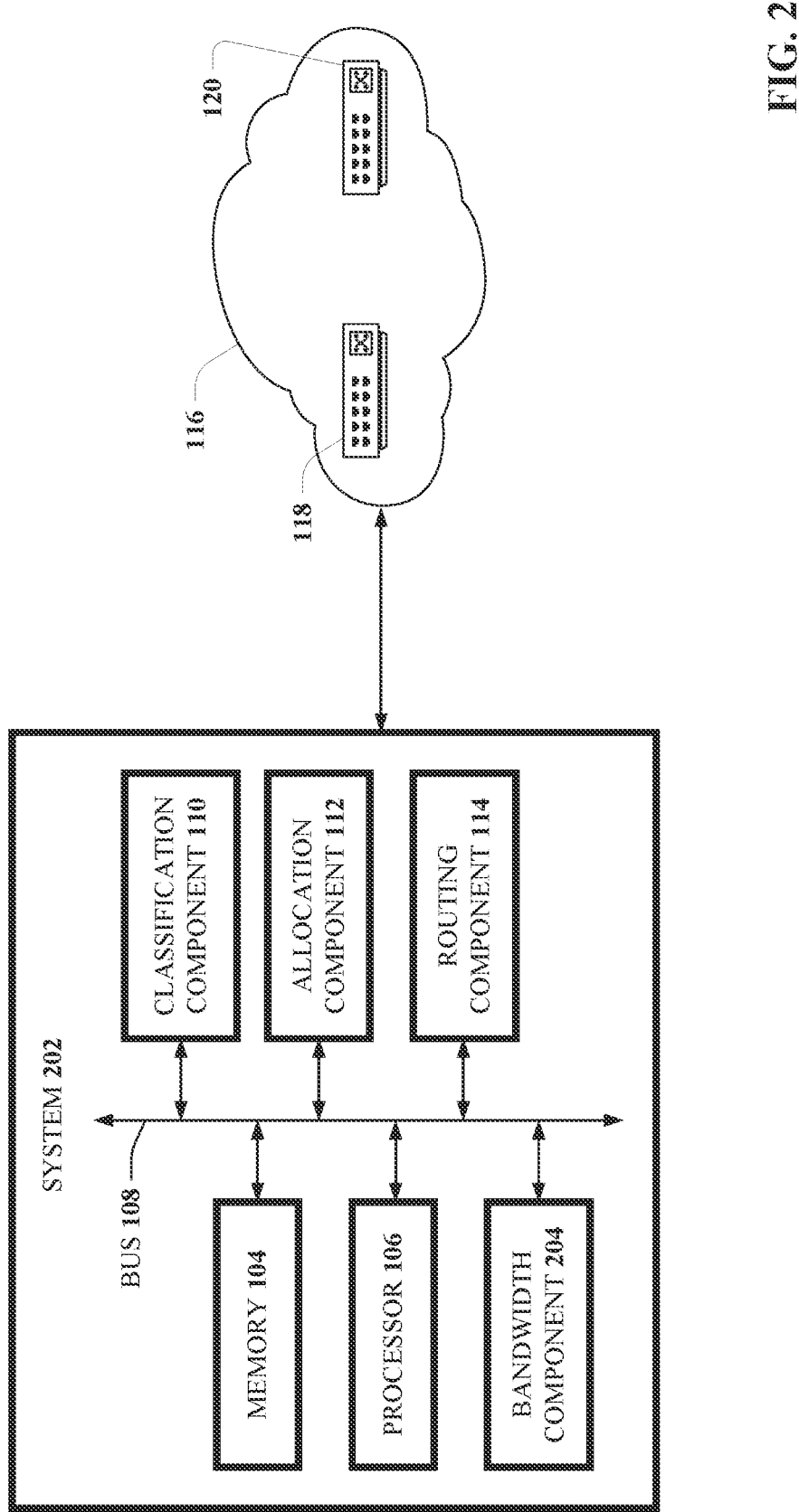
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to optimized network routing and bandwidth balancing. The system 202 can be similar to system 102, and can comprise one or more of a variety of components, such as memory 104, processor 106, bus 108, classification component 110, allocation component 112, and/or routing component 114. In various embodiments, the system 202 can be communicatively coupled to, or can further comprise, WAN 116, node 118, and/or node 120. The system 202 can further comprise a bandwidth component 204. In various embodiments, one or more of the memory 104, processor 106, bus 108, classification component 110, allocation component 112, routing component 114, WAN 116, node 118, node 120, and/or bandwidth component 204 can be communicatively or operably coupled (e.g., over a bus or wireless network) to one another to perform one or more functions of the system 202.

According to an embodiment, the bandwidth component 204 can, based on the route and using machine learning applied to past routes, other than the route, set a bandwidth for the route that has been determined to satisfy a defined wide area network quality criterion. In various embodiments, the defined wide area network quality criterion can be satisfied as a function of a threshold wide area network quality metric. In this regard, the threshold wide area network quality metric can comprise a latency metric or a quality of service metric associated with other routes, other than the route. Depending on the final resulting class, in which the first goal is the allow regional optimization, and then local, the amount of bandwidth to allocate for a given route can be set by the bandwidth allocation component 204.

If the result does not yield a class that achieves a defined criterion, then the amount of bandwidth to allocate can be adjusted (e.g., by a system herein) as a variable input for the routes. If the result is satisfactory (e.g., according to a defined criterion) at that bandwidth setting, then both the route to take and corresponding the amount of bandwidth can be set for each node-pair. In this regard, predictions can be made for each route (e.g., via the allocation component 112 and/or bandwidth component 204), and if not optimal (e.g., according to a defined criterion), the allocation component 112 and/or bandwidth component 204 can perform the predictions again using different potential values for the amount of bandwidth to allocate.

Figure 3:
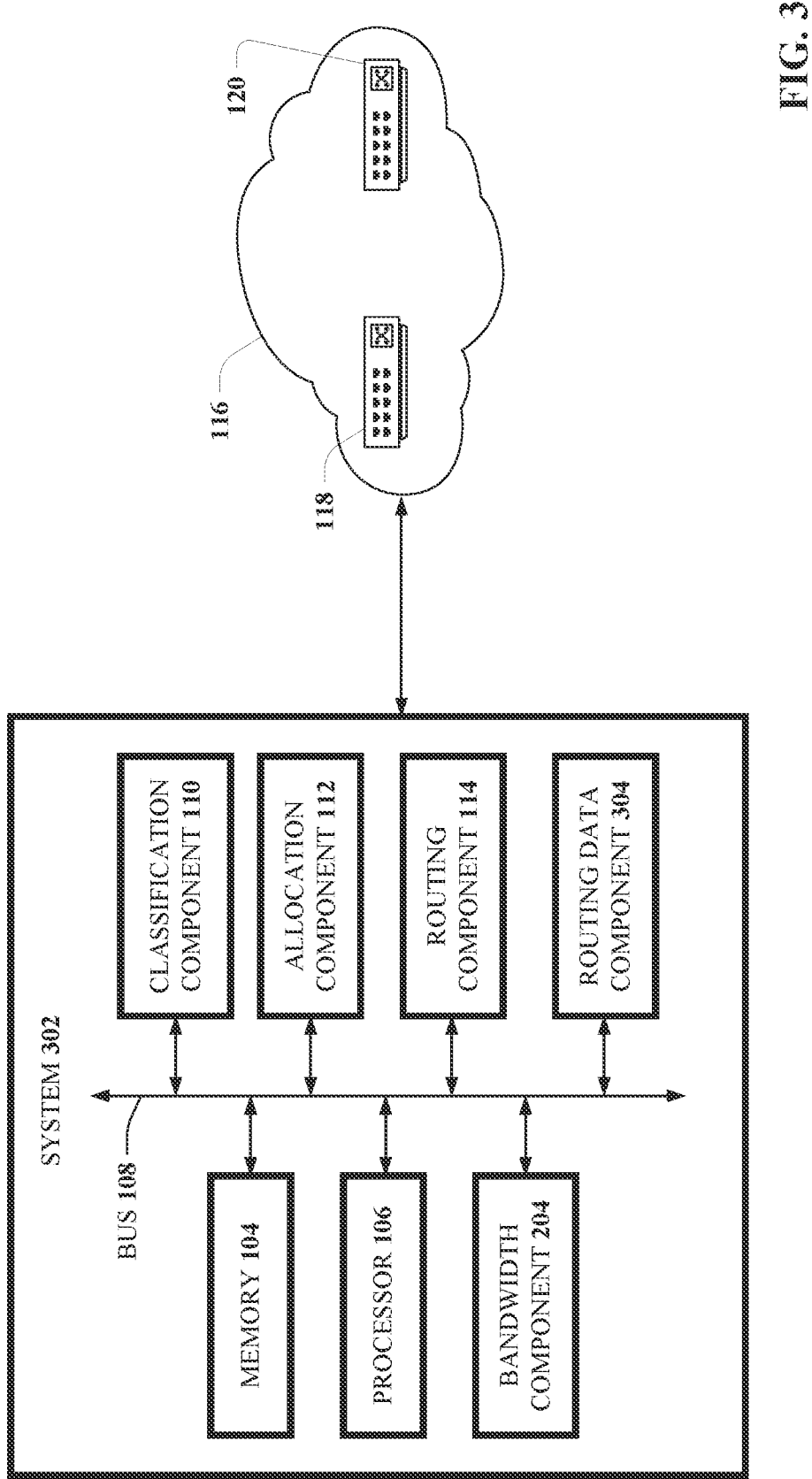
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to optimized network routing and bandwidth balancing. The system 302 can be similar to system 202, and can comprise one or more of a variety of components, such as memory 104, processor 106, bus 108, classification component 110, allocation component 112, routing component 114, and/or bandwidth component 204. In various embodiments, the system 302 can be communicatively coupled to, or can further comprise, WAN 116, node 118, and/or node 120. The system 302 can further comprise a routing data component 304. In various embodiments, one or more of the memory 104, processor 106, bus 108, classification component 110, allocation component 112, routing component 114, WAN 116, node 118, node 120, bandwidth component 204, and/or routing data component 304 can be communicatively or operably coupled (e.g., over a bus or wireless network) to one another to perform one or more functions of the system 302.

According to an embodiment, the routing data component 304 can determine network routing data applicable to the WAN 116. As discussed above, such network routing data can comprise network quality data, region data, node pair data, or other suitable network routing data. In various embodiments, the routing data component 304 can determine or measure the network quality data, region data, node pair data, or other suitable network routing data using one or more suitable sensors or measurement devices or components. In various embodiments, this network routing data can be utilized by the classification component 110 (e.g., or another suitable component), for instance, to classify available routes between the source node (e.g., node 118) on the wide area network (e.g., WAN 116) and the destination node (e.g., node 120) on the wide area network (e.g., WAN 116), resulting in the classified available routes.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, a component or system herein can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by a component or system herein. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, a component or system herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, a component or system herein can perform a utility-based analysis that factors cost of initiating the above-described operations versus benefit. In this embodiment, a component or system herein can use one or more additional context conditions to determine various thresholds herein.

To facilitate the above-described functions, a component or system herein can perform classifications, correlations, inferences, and/or expressions associated with principles of artificial intelligence. For instance, a component or system herein can employ an automatic classification system and/or an automatic classification. In one example, a component or system herein can employ a probabilistic and/or statistical-based analysis (e.g., factoring into the analysis utilities and costs) to learn and/or generate inferences. A component or system herein can employ any suitable machine-learning based techniques, statistical-based techniques and/or probabilistic-based techniques. For example, a component or system herein can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, a component or system herein can perform a set of machine-learning computations. For instance, a component or system herein can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 4:
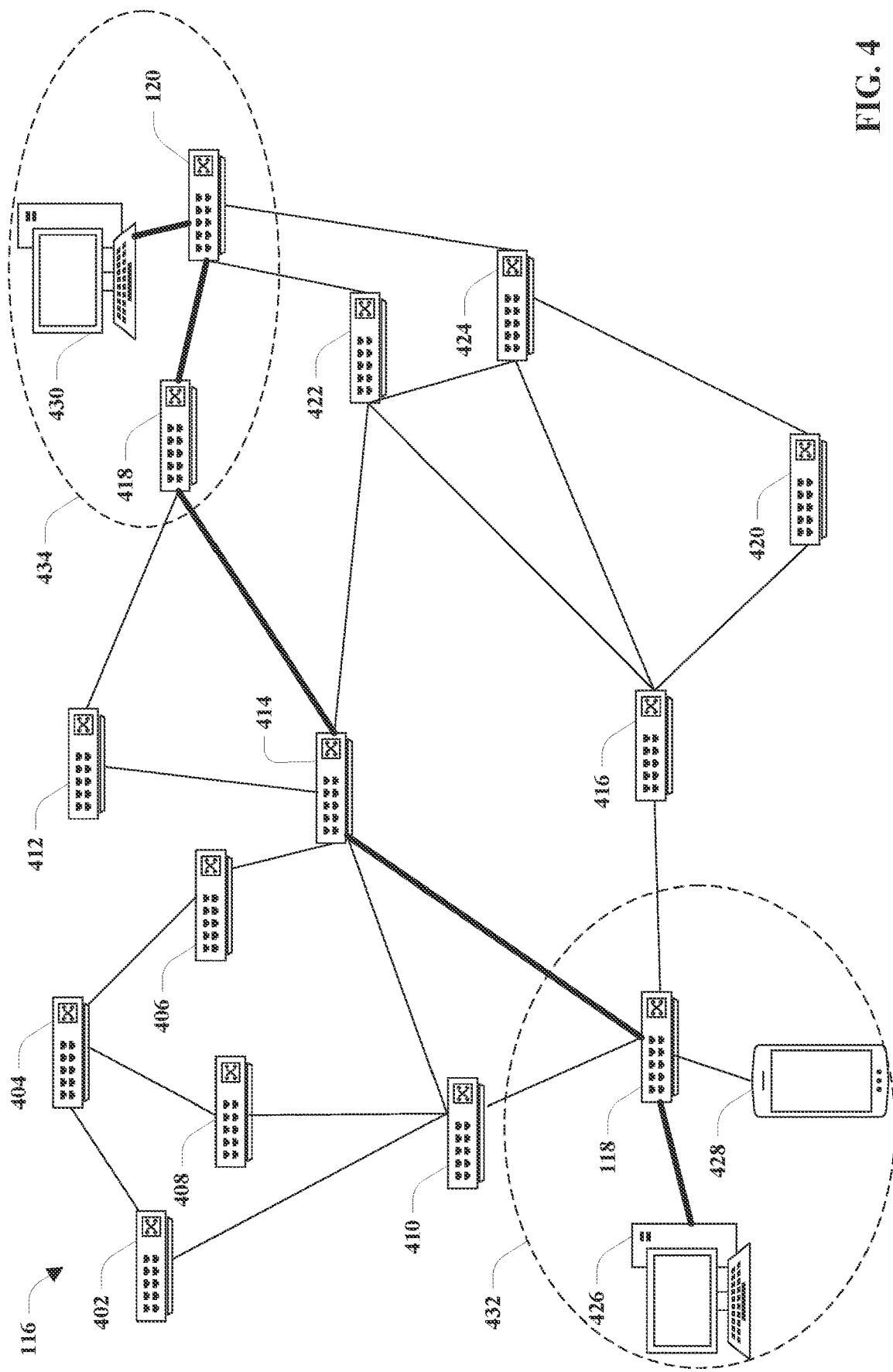
FIG. 4 is a block diagram of an exemplary wide area network topology in accordance with one or more embodiments described herein.

FIG. 4 is a block diagram of an exemplary WAN 116 topology in accordance with one or more embodiments described herein. In this nonlimiting example, WAN 116 can comprise one or more of node 402, node 404, node 406, node 408, node 410, node 412, node 414, node 416, node 418, node 420, node 422, node 424, user device 426, user device 428, user device 430, LAN 432, and/or LAN 434. In FIG. 4, an exemplary path (e.g., route) from node 118 to node 120 is depicted (e.g., via bolded lines between nodes), though this path (e.g., route) is purely exemplary and/or for purposes of illustration. In this regard, the path from node 118 to node 120 can comprise node 118 to node 414 to node 418 to node 120. This path can connect user device 426 to user device 430. In various embodiments, the LAN 432 can comprise source node 118, user device 426, and/or user device 428. Similarly, the LAN 434 can comprise destination node 120, node 418, and/or user device 430. In various embodiments, the user device 426 and/or user device 430 can comprise a computer or server. In various embodiments, the user device 428 can comprise a mobile device. It is noted that one or more of the one or more of node 402, node 404, node 406, node 408, node 410, node 412, node 414, node 416, node 418, node 420, node 422, node 424, user device 426, user device 428, user device 430, LAN 432, and/or LAN 434 can be communicatively coupled to one another, and one or more of a variety of paths between nodes herein can be utilized by a system herein.

Figure 5:
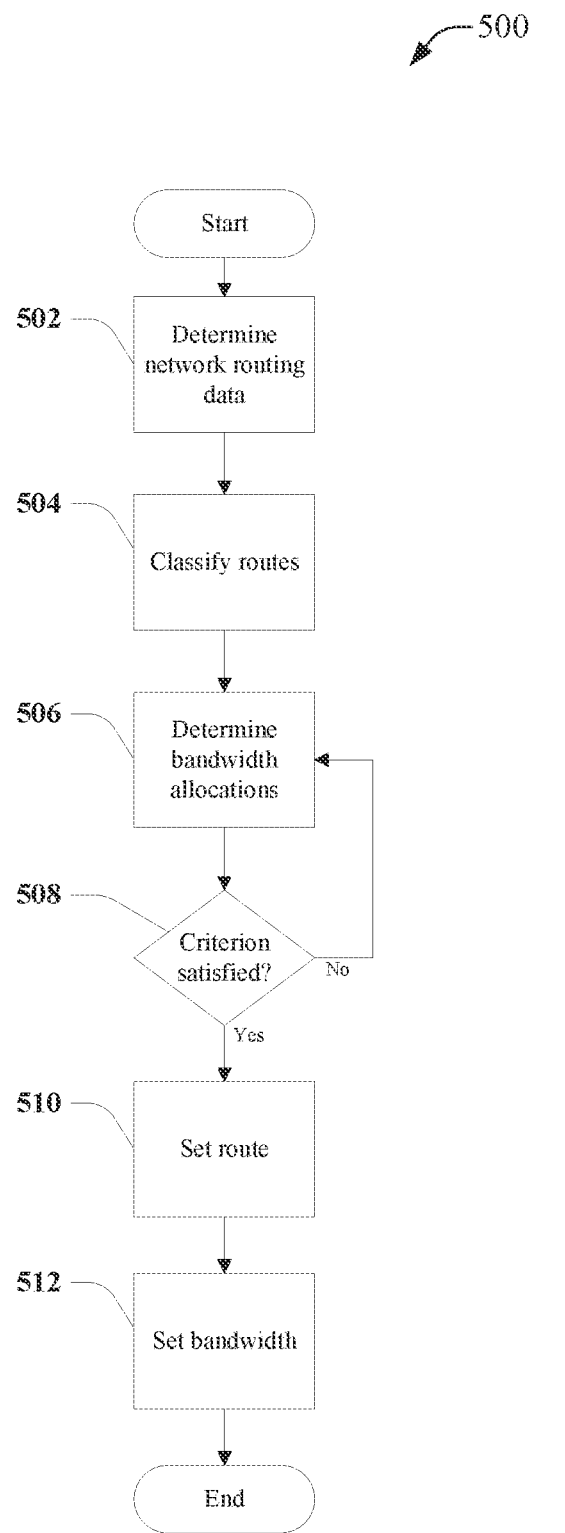
FIG. 5 is a flowchart for a process associated with optimized network routing and bandwidth balancing in accordance with one or more embodiments described herein.

Turning now to FIG. 5, there is illustrated a flowchart of a process 500 relating to optimized network routing and bandwidth balancing in accordance with one or more embodiments described herein. At 502, the routing data component 304 can determine network routing data applicable to a wide area network (e.g., WAN 116). At 504, the classification component 110 can, based on the network routing data and using machine learning applied to historical network routing data (e.g., other than the network routing data), classify available routes between a source node (e.g., node 118) on the wide area network (e.g., WAN 116) and a destination node (e.g., node 120) on the wide area network (e.g., WAN 116), resulting in classified available routes. At 506, the allocation component 112 can (e.g., based on the network routing data and using a result of the machine learning applied to the historical network routing data), determine bandwidth allocations applicable to the classified available routes, resulting in predicted bandwidth allocations. At 508, if a defined criterion is determined to be satisfied by one or more of the classified routes (e.g., a defined wide area network latency criterion applicable to the wide area network, a defined wide area network quality of service criterion applicable to the wide area network, a defined local area network latency criterion applicable to at least one of the source node or the destination node, or a defined local area network quality of service criterion applicable to at least one of the source node or the destination node) (e.g., Yes at 508), the process 500 can proceed to 510. If at 508, the defined criterion is not satisfied (e.g., No at 508), the process can return to 506. At 510, the routing component 114 can (e.g., based on the classified available routes and the predicted bandwidth allocations), set a route for data transmitted from the source node (e.g., node 118) to the destination node (e.g., node 120). At 512, the bandwidth component 204 can (e.g., based on the route and using machine learning applied to past routes, other than the route), set a bandwidth for the route that has been determined to satisfy a defined wide area network quality criterion.

Figure 6:
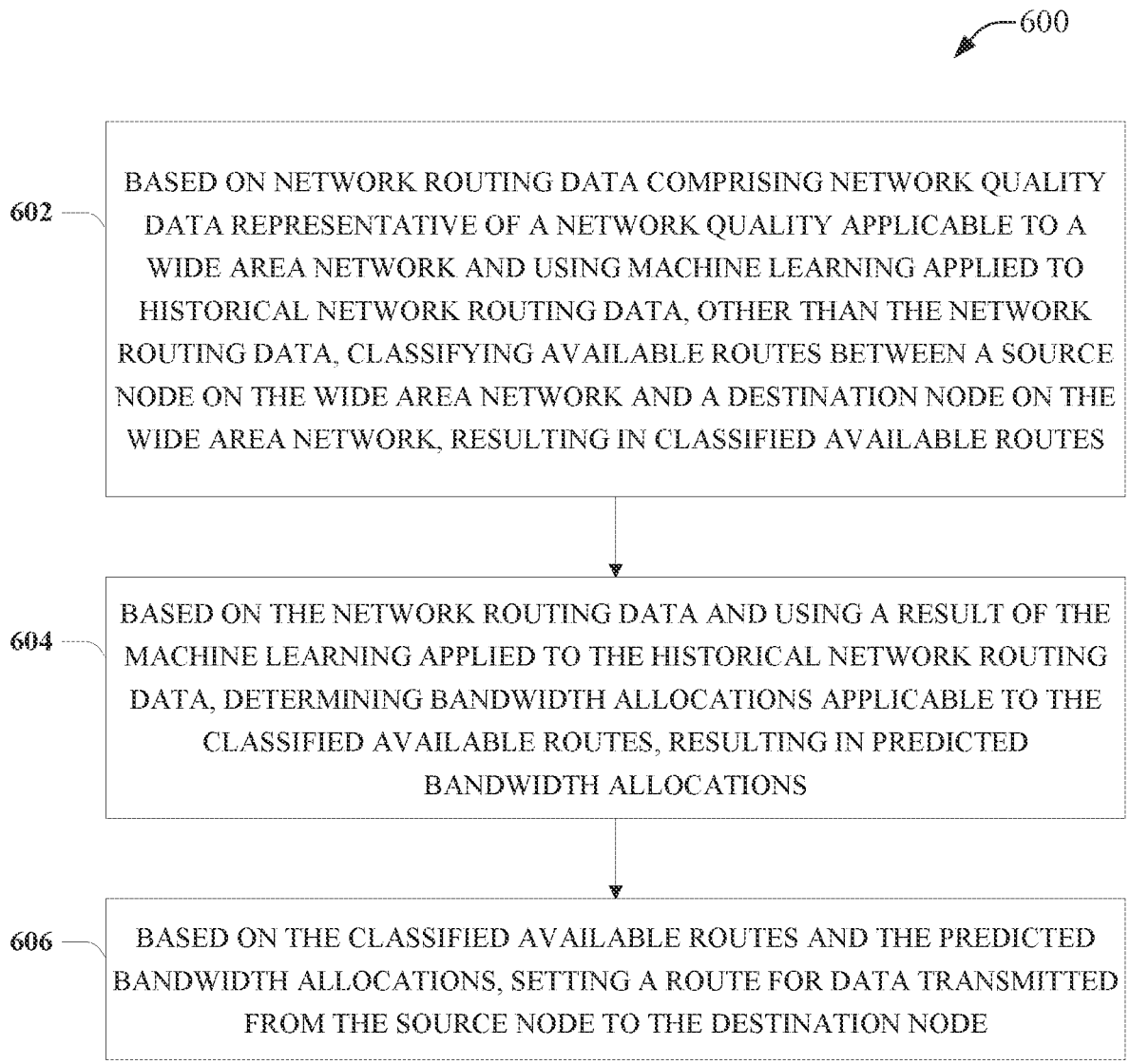
FIG. 6 is a block flow diagram for a process associated with optimized network routing and bandwidth balancing in accordance with one or more embodiments described herein.

FIG. 6 illustrates a block flow diagram for a process 600 associated with optimized network routing and bandwidth balancing in accordance with one or more embodiments described herein. At 602, the process 600 can comprise, based on network routing data comprising network quality data representative of a network quality applicable to a wide area network (e.g., WAN 116) and using machine learning applied to historical network routing data, other than the network routing data, classifying (e.g., via the classification component 110) available routes between a source node (e.g., node 118) on the wide area network (e.g., WAN 116) and a destination node (e.g., node 120) on the wide area network (e.g., WAN 116), resulting in classified available routes. At 604, the process 600 can comprise, based on the network routing data and using a result of the machine learning applied to the historical network routing data, determining (e.g., via the allocation component 114) bandwidth allocations applicable to the classified available routes, resulting in predicted bandwidth allocations. At 606, the process 600 can comprise, based on the classified available routes and the predicted bandwidth allocations, setting (e.g., via the routing component 114) a route for data transmitted from the source node (e.g., node 118) to the destination node (e.g., node 120).

FIG. 7 illustrates a block flow diagram for a process 700 associated with optimized network routing and bandwidth balancing in accordance with one or more embodiments described herein. At 702, the process 700 can comprise, based on network routing data comprising network quality data representative of a network quality applicable to a wide area network (e.g., WAN 116) and using machine learning applied to historical network routing data, generated from a time previous to the network routing data being generated, classifying (e.g., via the classification component 110) available routes between a source node (e.g., node 118) on the wide area network (e.g., WAN 116) and a destination node (e.g., node 120) that are part of the wide area network (e.g., WAN 116), resulting in classified available routes. At 704, the process 700 can comprise, based on the network routing data and using the machine learning applied to the historical network routing data, determining (e.g., via the allocation component 112) bandwidth allocations applicable to the classified available routes, resulting in predicted bandwidth allocations. At 706, the process 700 can comprise, based on the classified available routes and the predicted bandwidth allocations, setting (e.g., via the routing component 114) a route for data transmitted from the source node (e.g., node 118) to the destination node (e.g., node 120).

Figure 8:
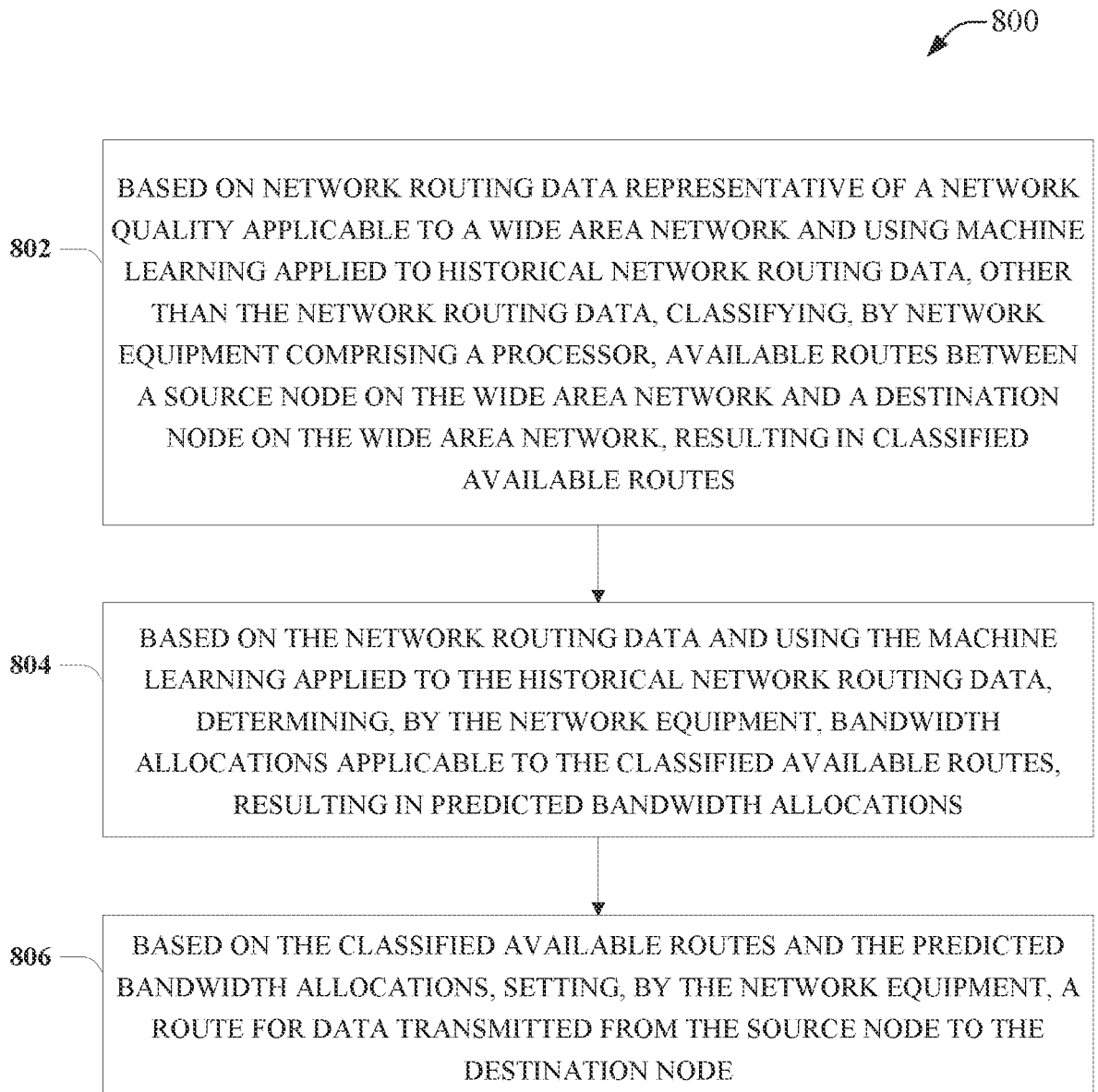
FIG. 8 is a block flow diagram for a process associated with optimized network routing and bandwidth balancing in accordance with one or more embodiments described herein.

FIG. 8 illustrates a block flow diagram for a process 800 associated with optimized network routing and bandwidth balancing in accordance with one or more embodiments described herein. At 802, the process 800 can comprise, based on network routing data representative of a network quality applicable to a wide area network (e.g., WAN 116) and using machine learning applied to historical network routing data, other than the network routing data, classifying, by network equipment comprising a processor (e.g., via the classification component 110), available routes between a source node (e.g., node 118) on the wide area network (e.g., WAN 116) and a destination node (e.g., node 120) on the wide area network (e.g., WAN 116), resulting in classified available routes. At 804, the process 800 can comprise, based on the network routing data and using the machine learning applied to the historical network routing data, determining, by the network equipment (e.g., via the allocation component 112), bandwidth allocations applicable to the classified available routes, resulting in predicted bandwidth allocations. At 806, the process 800 can comprise, based on the classified available routes and the predicted bandwidth allocations, setting, by the network equipment (e.g., via the routing component 114), a route for data transmitted from the source node (e.g., node 118) to the destination node (e.g., node 120).

Figure 9:
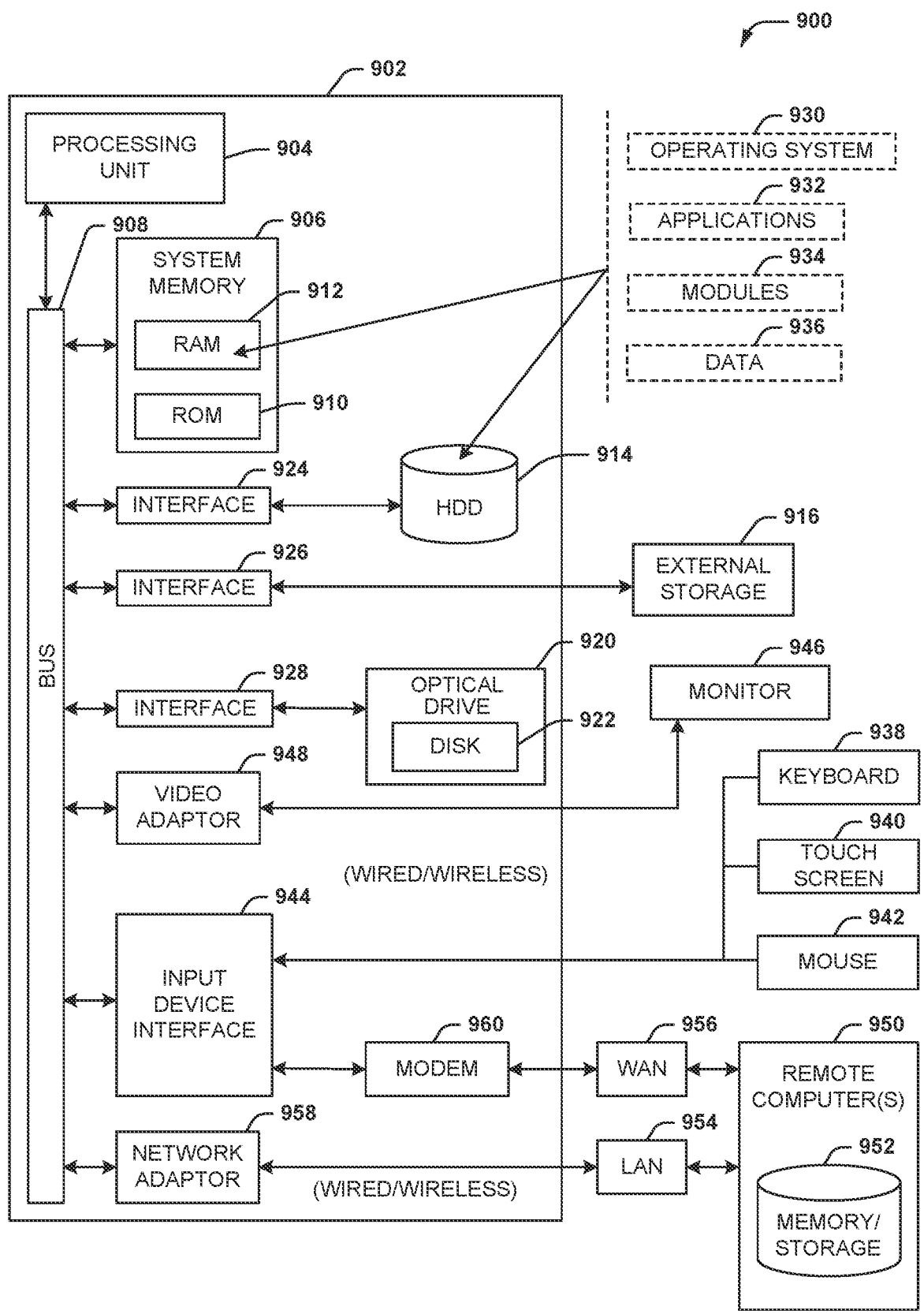
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, or another suitable disk 922). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a LAN 954 and/or larger networks, e.g., a WAN 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local area network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
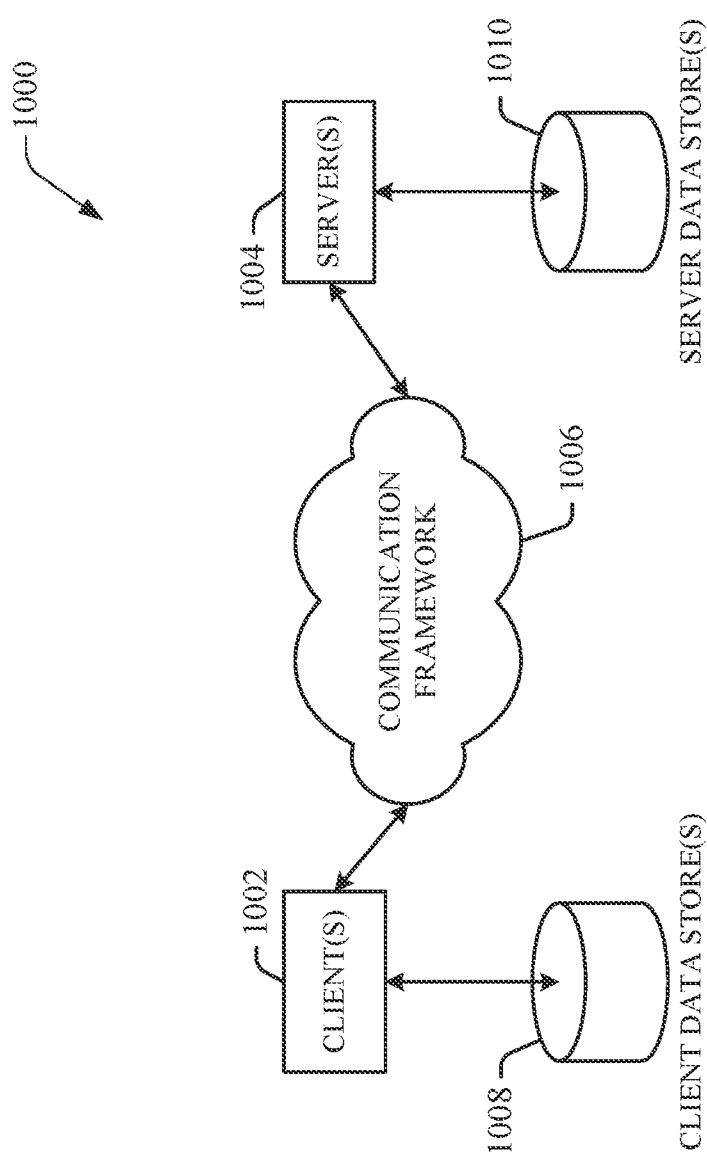
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002. (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file. (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system comprising at least one processor, wherein the at least one processor is configured to:
    based on network routing data comprising network quality data representative of a network quality applicable to a wide area network and using machine learning applied to historical network routing data, other than the network routing data, classify available routes between a source node on the wide area network and a destination node on the wide area network, resulting in classified available routes;
    based on the network routing data and using a result of the machine learning applied to the historical network routing data, determine bandwidth allocations applicable to the classified available routes, resulting in predicted bandwidth allocations;

based on the classified available routes and the predicted bandwidth allocations, set a route for data transmitted from the source node to the destination node; and based on the route and using machine learning applied to past routes, other than the route, set a bandwidth for the route that has been determined to satisfy a defined wide area network quality criterion applicable to the wide area network.

2. The system of claim 1, wherein the route is determined to satisfy a defined wide area network latency criterion applicable to the wide area network.

3. The system of claim 1, wherein the route is determined to satisfy a defined wide area network quality of service criterion applicable to the wide area network.

4. The system of claim 1, wherein the route is determined to satisfy a defined local area network latency criterion applicable to the source node or the destination node.

5. The system of claim 1, wherein the route is determined to satisfy a defined local area network quality of service criterion applicable to the source node or the destination node.

6. The system of claim 1, wherein the network routing data further comprises region data, and wherein the region data comprises one or more regional metrics applicable to at least one of the source node or the destination node.

7. The system of claim 6, wherein the one or more regional metrics comprise at least one of a region identifier, a first quantity of active node pairs in a region comprising the source node or the destination node, a second quantity of node pair routes in the region, an average packet latency applicable to the region, an average network throughput applicable to the region, a quality according to a defined quality metric applicable to the region, or a total bandwidth applicable to the region.

8. The system of claim 1, wherein at least one of the source node or the destination node comprises a network router or a network switch.

9. The system of claim 1, wherein the network routing data further comprises node pair data representative of one or more metrics applicable to a node pair comprising a pair of nodes that are part of the wide area network.

10. The system of claim 9, wherein the node pair data comprises a route identifier applicable to the node pair, a latency applicable to the node pair, a throughput applicable to the node pair, or a quality according to a defined quality metric applicable to the node pair.

11. The system of claim 1, wherein the defined wide area network quality criterion is satisfied as a function of a threshold wide area network quality metric.

12. The system of claim 11, wherein the threshold wide area network quality metric comprises a latency metric or a quality of service metric associated with other routes, other than the route.

13. The system of claim 1, wherein the at least one processor is further configured to:
determine the network routing data.

14. A non-transitory machine-readable medium, comprising executable instructions that, when executed by at least one processor, cause the at least one processor to:
based on network routing data comprising network quality data representative of a network quality applicable to a wide area network and using machine learning applied to historical network routing data, generated from a time previous to the network routing data being generated, classify available routes between a source node on the wide area network and a destination node that are part of the wide area network, resulting in classified available routes;

based on the network routing data and using the machine learning applied to the historical network routing data, determine bandwidth allocations applicable to the classified available routes, resulting in predicted bandwidth allocations;

based on the classified available routes and the predicted bandwidth allocations, set a route for data transmitted from the source node to the destination node; and based on the route and using machine learning applied to past routes, other than the route, set a bandwidth for the route that has been determined to satisfy a defined wide area network quality criterion.

15. The non-transitory machine-readable medium of claim 14, wherein the historical network routing data comprises one or more metrics comprising:
historical region data comprising one or more historical regional metrics applicable to the wide area network, or
historical node pair data representative of one or more historical metrics applicable to a node pair comprising a pair of nodes that are part of the wide area network, or
historical network quality data representative of historical network quality applicable to the wide area network.

16. The non-transitory machine-readable medium of claim 14, wherein the route is determined to satisfy:
a defined wide area network latency criterion applicable to the wide area network,
a defined wide area network quality of service criterion applicable to the wide area network,
a defined local area network latency criterion applicable to at least one of the source node or the destination node, or
a defined local area network quality of service criterion applicable to at least one of the source node or the destination node.

17. A method, comprising:
based on network routing data representative of a network quality applicable to a wide area network and using machine learning applied to historical network routing data, other than the network routing data, classifying, by network equipment comprising at least one processor, available routes between a source node on the wide area network and a destination node on the wide area network, resulting in classified available routes;

based on the network routing data and using the machine learning applied to the historical network routing data, determining, by the network equipment, bandwidth allocations applicable to the classified available routes, resulting in predicted bandwidth allocations;

based on the classified available routes and the predicted bandwidth allocations, setting, by the network equipment, a route for data transmitted from the source node to the destination node; and based on the route and using machine learning applied to past routes, other than the route, setting, by the network equipment, a bandwidth for the route that has been determined to satisfy a defined wide area network quality criterion.

18. The method of claim 17, wherein the network routing data comprises region data, and wherein the region data comprises one or more regional metrics applicable to the source node or the destination node.

19. The method of claim 17, wherein the network routing data comprises node pair data representative of one or more metrics applicable to a pair of nodes on the wide area network.

20. The method of claim 17, wherein the defined wide area network quality criterion is satisfied as a function of a threshold wide area network quality metric.

\* \* \* \* \*